Feb. 13, 1934.    S. BURROWS    1,947,328
TIPPING GEAR FOR BODIES OF MOTOR VEHICLES
Filed Sept. 30, 1930    2 Sheets-Sheet 1

Inventor:
Stanley Burrows

Feb. 13, 1934.    S. BURROWS    1,947,328
TIPPING GEAR FOR BODIES OF MOTOR VEHICLES
Filed Sept. 30, 1930    2 Sheets-Sheet 2

Inventor:
Stanley Burrows
by Langner, Parry, Card & Langner
Attys.

Patented Feb. 13, 1934

1,947,328

UNITED STATES PATENT OFFICE 1,947,328

TIPPING GEAR FOR BODIES OF MOTOR VEHICLES

Stanley Burrows, Petone, Wellington, New Zealand, assignor of one-half to Charles Lawrence Neilsen, Petone, Wellington, New Zealand Application September 30, 1930, Serial No. 485,504, and in New Zealand October 9, 1929

3 Claims. (Cl. 298—22)

This invention relates to gear used with bodies of motor vehicles, such as lorries, for tipping or discharging loads therefrom, and comprises improvements in that type of tipping gear wherein hydraulic rams are used for elevating the vehicle bodies.

According to the invention, the improved tipping gear comprises a beam pivoted at one end to a fixture and pivotally connected at the other end with a tipping body, and a hydraulic ram engaging said beam adapted to be operated to move the latter to raise the body to a load discharging position.

Preferably the beam is fulcrumed on the ram casting which may or may not contain the oil reservoir from which oil is pumped to the ram cylinder, the other end of the beam being pivoted to an arm mounted on a cross member held in brackets secured to the underside of the vehicle body.

Means can also be provided, and actuated from the beam fulcrum pin, whereby upon the body reaching the desired raised position, lifting movement by the ram is caused to cease.

Means are provided for locking the vehicle body so as to eliminate vibration, and to prevent an overhanging vehicle body from tipping inadvertently. The locking means is operated by the ram before the latter lifts the beam, and by a spring after the ram has lowered the beam, and the vehicle body has come to rest in its lowered position.

Figure 1:
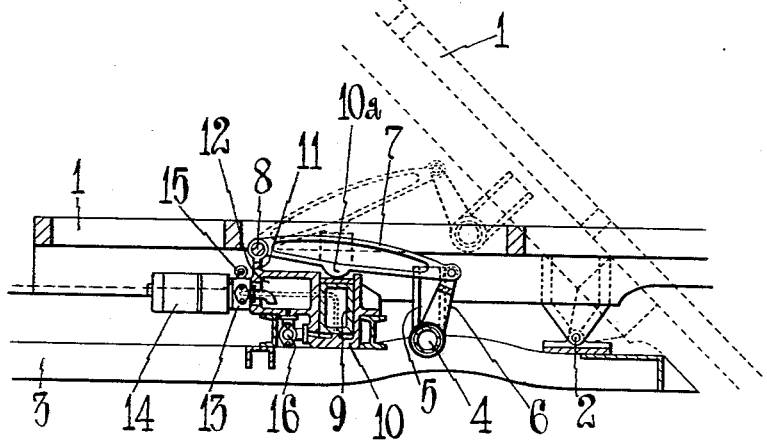
Figure 2:
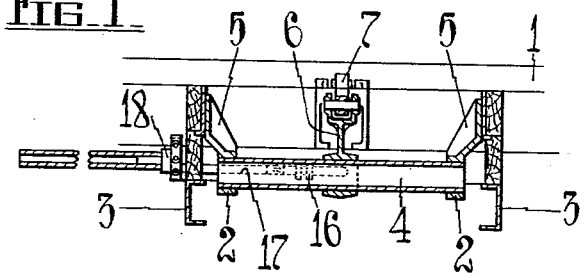
Figure 3:
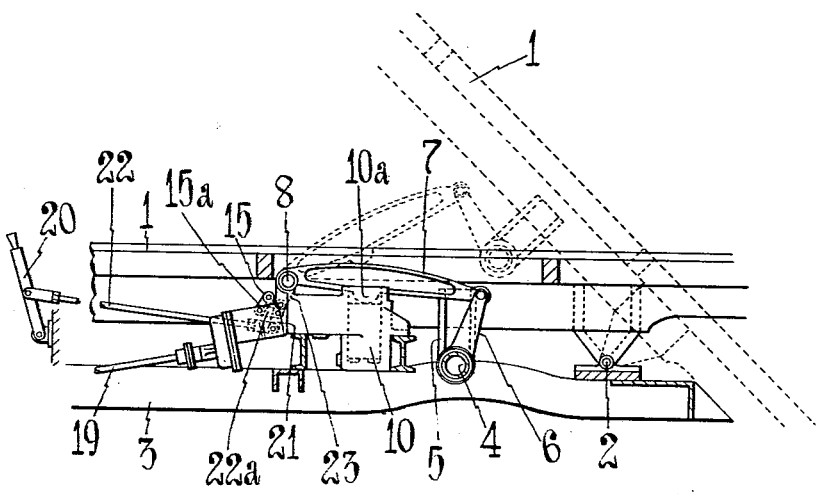

In the accompanying drawings in conjunction with which the invention will be more particularly described, Fig. 1 is a part longitudinal sectional elevation of a vehicle fitted with the improved tipping gear, and Fig. 2 is a part cross sectional view thereof, while Fig. 3 is a part elevation showing fluid valve control means fitted to tipping gear, wherein a mechanical drive to the oil pump is used.

Figure 4:
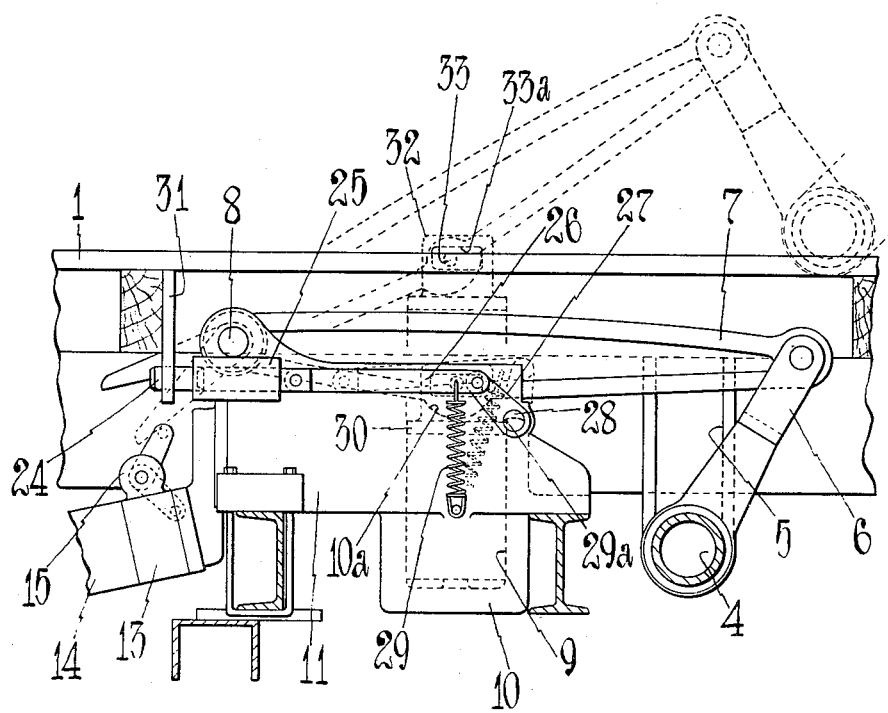

Fig. 4 is a part longitudinal elevation on a larger scale showing locking gear for securing the vehicle body.

The body 1 to be tipped is hinged at 2 to the chassis frame 3 at the rear of the vehicle, and at a point a suitable distance forward of the body hinge 2 a cross member 4 which may be tubular is mounted in brackets 5 attached to longitudinal runners or other suitable parts of the body 1.

A lifting arm 6 mounted on the cross member 4 is pivotally connected at its outer end to the rear end of a beam 7, the forward end of which is pivoted at 8 to a fitting or fixture 11 suitably mounted on the chassis frame 3.

Means such as a hydraulic ram 9, are provided and operated to engage the beam 7 and force the latter upwards and so raise the body 1 on its hinge 2.

Where the ram 9 engages the beam 7, the latter is provided with a projection 10ª or renewable wearing portion.

The ram 9 operates in a cylinder 10 forming part of the fitting or fixture 11 which can also contain an oil reservoir 12.

A pump 13 is provided for drawing oil from the reservoir 12 and forcing same to the ram cylinder 10, said pump being driven either by a directly coupled motor 14 receiving electrical energy from the electrical equipment of the vehicle, or through a mechanical drive 19 (Fig. 3) from any convenient part of the mechanical gear of said vehicle.

The pump 13 with its oil reservoir 12 can be located in any suitable position on the vehicle underframe, the oil being passed if necessary through a pipe line from said pump 13 to the ram cylinder 10, the pump being either electrically or mechanically operated as before stated.

A by-pass valve 15 operated from a convenient position on the vehicle is provided for controlling the passage of oil between the ram cylinder 10 and the reservoir 12, and for allowing oil to be returned to the latter from the ram cylinder, so as to permit the vehicle body 1 to return to its lowered position by gravity.

In addition to or instead of the power driven pump 13, a hand operated pump 16 may be provided for forcing oil to the ram cylinder 10 in order to raise the body 1, the plunger of said pump 16 being operated through a connecting rod 17 from a detachable rocker handle 18.

Instead of a single ram 9 and beam 7, a plurality of rams and beams may be employed to impart lifting movement to the body 1, all of the rams being operated from the same pump.

When a mechanical drive 19 (Fig. 3) is used to operate the pump 13, means can be provided so that movements of the control handle 20 correspond with progressive movements of the beam 7 and with it the vehicle body 1.

This is attained by employing a link system having a floating fulcrum, wherein the movement of the vehicle body 1 in tipping follows a corresponding movement of the control handle 20 for operating the tipping gear.

In one form, a link 21 is connected to the driver's control rod 22 at one end and at the other end to a lever 23 keyed to the pivot shaft 8 of the lifting beam 7. At a suitable point between the ends of the link 21 a further link 22ᵃ is pivoted, this operating the control or release valve 15 through the arm 15ᵃ thereof.

The arrangement is such that when the control handle 20 is moved towards the "raise" position, the valve 15 is closed and with the pump transmission in gear, oil is pumped to the cylinder 10 and the beam 7 is caused to lift the vehicle body 1. As it does so, however, the valve 15 is moved towards the "open" position, until a position of equilibrium is reached, arresting further movement of the beam 7 and vehicle body 1 until the control handle 20 is again operated.

The means for locking the vehicle body 1 in its lowered position comprises a bolt 24 slidable in a boss 25 which is integral with the fitting or fixture 11. A link 26 connects the bolt 24 to a lever 27 keyed on a spindle 28, which passes through cylinder casting 10. At its central part, the spindle 28 is cut away until it is approximately semi-circular in cross section, the face thus formed being slightly concave. A spring 29 in tension and attached to the link 26 near the lever 27 keeps one edge 29ᵃ of the semi-circular portion of the spindle 28 in contact with the ram 9 or a plate 30 fixed to the top of the ram. As the ram 9 rises, and before it reaches the projection 10ᵃ the spindle is given a partial rotation owing to the edge 29ᵃ being turned upwards by the said ram. The rotation of the spindle 28 and its lever 27 withdraw the bolt 24 from a hole provided in a plate 31 secured to the vehicle body, leaving the latter free to rise under the operation of the ram.

The plate 30 has two lugs 32 between which the beam 7 passes, and a pin 33 passes through the centre of the projection 10ᵃ of the beam and through slot 33ᵃ provided in the lugs 32. As the beam lifts, the pin 33 moves horizontally in the slots, there being no contact until and unless the beam lifts in advance of the ram, in which case the pin contacts with the upper surfaces of the slots 33ᵃ, and causes the ram to move with the beam 7.

What I do claim and desire to obtain by Letters Patent of the United States of America is:—

1. A tipping gear for bodies of motor vehicles comprising a beam pivoted at one end to a fixture upon said vehicle, means pivotally connecting the other end of said beam to the tipping body, a fixed vertically reciprocating hydraulic ram engaging said beam for moving said beam in order to move said body to a load discharging position, a fitting provided upon the vehicle under the frame thereof, said ram being mounted in said fitting, an oil reservoir in said fitting, a pump for forcing oil from said reservoir to said ram, a wearing portion provided upon said beam intermediate the ends thereof and said ram being so disposed in said fitting as to contact said wearing surface.

2. A tipping gear for bodies of motor vehicles comprising a beam pivoted at one end to a fixture upon said vehicle, means pivotally connecting the other end of said beam to the tipping body, a fixed vertically reciprocating hydraulic ram engaging said beam for moving said beam in order to move said body to a load discharging position, a fitting provided upon said vehicle under the frame thereof, a locking bolt cooperating with said fitting, a lever, a link connecting said locking bolt to said lever, a spindle to which said lever is fixed and said spindle having the central part thereof shaped substantially semi-circular and a spring under tension pressing one edge of the semi-circular part of said spindle against said ram.

3. A tipping gear for bodies of motor vehicles comprising a beam pivoted at one end to a fixture upon said vehicle, means pivotally connecting the other end of said beam to the tipping body, a fixed vertically reciprocating hydraulic ram engaging said beam for moving said beam in order to move said body to a load discharging position, a plate provided upon the top of said ram, a slotted lug upon said plate at each side of the said beam, a pin having the diameter less than the width of said slots and said pin being disposed through a projection upon said beam and through said slots.

STANLEY BURROWS.